No. 706,800. Patented Aug. 12, 1902.
L. B. COBB & C. M. JENKINS.
MEAT CHOPPER.
(Application filed May 1, 1902.)
(No Model.)
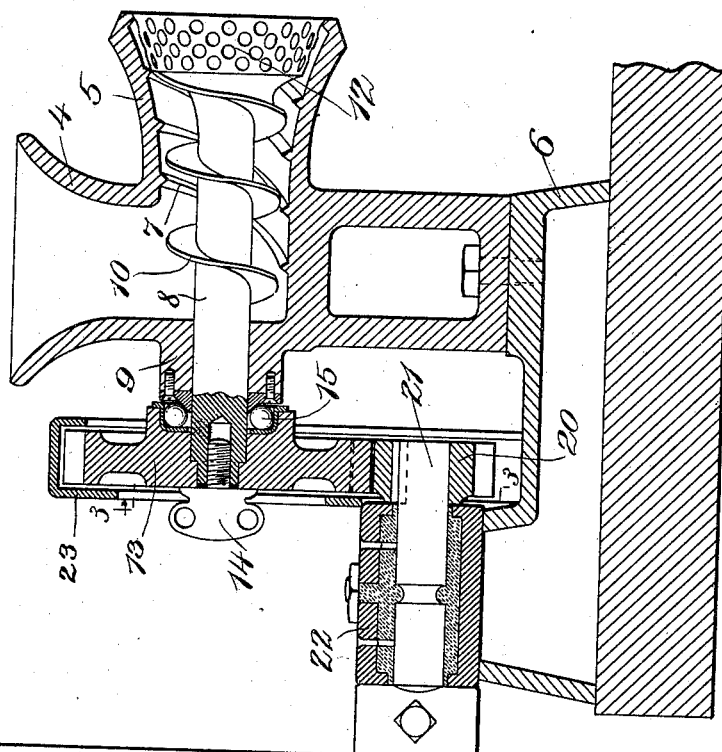
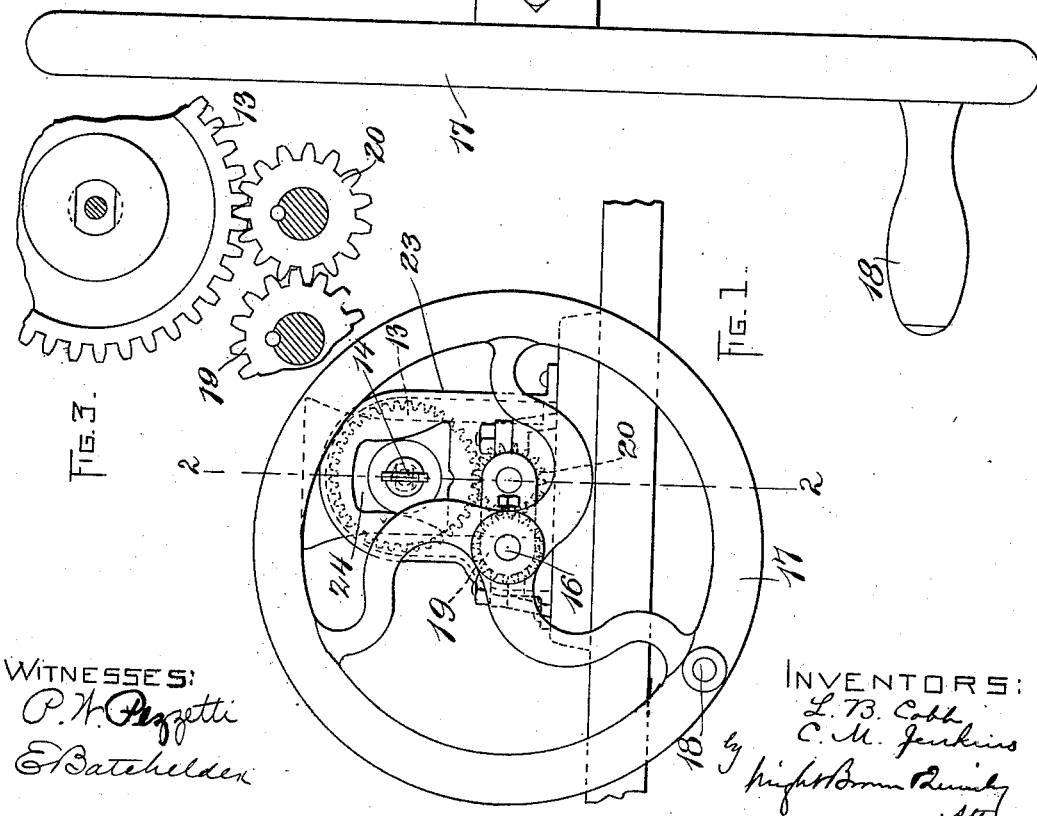
WITNESSES:
INVENTORS:
L. B. Cobb
C. M. Jenkins

UNITED STATES PATENT OFFICE.

LEANDER B. COBB, OF MALDEN, AND CHARLES M. JENKINS, OF SOMERVILLE, MASSACHUSETTS, ASSIGNORS TO WILLIAM G. BELL COMPANY, OF BOSTON, MASSACHUSETTS, A CORPORATION OF MASSACHUSETTS.

MEAT-CHOPPER.

SPECIFICATION forming part of Letters Patent No. 706,800, dated August 12, 1902.

Application filed May 1, 1902. Serial No. 105,465. (No model.)

*To all whom it may concern:*

Be it known that we, LEANDER B. COBB, of Malden, and CHARLES M. JENKINS, of Somerville, in the county of Middlesex and State of Massachusetts, have invented certain new and useful Improvements in Meat-Choppers, of which the following is a specification.

This invention relates to a meat-chopper comprising a frame having a receiving-hopper, a lateral outlet extending from the hopper and having a helical cutting-rib, and a shaft journaled in the frame and located in the outlet, the shaft having a helical blade constituting a cutting member which coöperates with the helical rib in the outlet, so that pieces of meat inserted in the hopper are carried by the rotation of the shaft through the outlet and are at the same time cut into small fragments.

The invention has for its object to provide means for advantageously applying hand or other power to the cutter-shaft for the purpose of rotating the same and at the same time permitting the ready detachment of the cutter-shaft from the mechanism which rotates it, so that the shaft may be readily cleaned after each period of use of the machine.

The invention consists in the improvements which we will now proceed to describe and claim.

Of the accompanying drawings, forming a part of this specification, Figure 1 represents a rear end elevation of a machine embodying our invention. Fig. 2 represents a section on line 2 2 of Fig. 1. Fig. 3 represents a section on line 3 3 of Fig. 2.

The same reference characters indicate the same parts in all the figures.

The frame of the machine comprises a hopper or receiver 4, having a lateral outlet 5, the part of the frame on which said hopper and outlet are formed being mounted upon a suitable supporting-base 6. The hopper and outlet are of the usual form, and the outlet is provided with a cutting member, here shown as a helical rib 7, which is V-shaped in cross-section. 8 represents a horizontal shaft, which is journaled in a bearing 9 and is located within the outlet 5, the said shaft being provided with a cutting member formed as a helical blade 10, which coöperates with the cutting member 7 in reducing to small particles pieces of meat introduced into the hopper. The outer end of the shaft 8 is or may be provided with an annular perforated strainer 12.

The construction thus far described is old and forms no part of our present invention.

One end of the shaft 8 is formed to project sufficiently outside of the bearing 9 to receive a gear 13, which is detachably secured to the projecting end of the shaft by means of a clamping-screw 14, engaged with a threaded socket formed in the projecting portion of the shaft. Ball-bearings 15 are preferably provided between a ball-cup fixed to the gear and a ball-track fixed to the bearing 9, as shown in Fig. 2. 16 represents a driving-shaft, which may be rotated by any suitable means, the means here shown being a hand-wheel 17, affixed to said shaft and provided with a handle 18. The shaft 17 is provided with a gear 19, meshing with an intermediate gear 20, which is located under the detachable gear 13 and meshes therewith, the gear 20 being affixed to a shaft 21, which is journaled in a bearing 22 on the supporting-frame.

23 represents a hood fixed to the supporting-frame and inclosing the gears 13, 19, and 20, said hood having in its outer side an opening 24, which affords access to the clamping-screw 14, so that said screw can be readily removed to permit the removal and cleansing of the shaft 8 and of the outlet 5. The hood 23 is formed to project over the sides of the gear 24, and its internal surface is in close proximity to the periphery of said gear, so that when the clamping-screw 14 is removed the gear 24 is retained conjointly by the intermediate gear 20 and by the hood 23 in position to receive the shaft 8 when the latter is again inserted.

It will be seen that the location of the intermediate gear 20 below the gear 13 enables the intermediate gear to support the detachable gear against downward displacement when the shaft 8 is removed. It will also be seen that the casing 23 coöperates with the intermediate gear 20 in preventing displacement of the detachable gear 13 in all other directions. We have therefore provided for the convenient detachment of the shaft 8 from the driving mechanism and the equally convenient engagement of the shaft with said mechanism, so that the machine may be readily cleansed and as readily restored to its operative condition.

We claim—

1. A meat-chopper comprising a frame having a receiving-hopper and a lateral outlet, a cutter-shaft journaled in said frame and located in said outlet, said shaft and outlet having coöperating cutting members, one end of the cutter-shaft projecting through a bearing formed at one end of the casing, a gear detachably secured to the projecting end of the cutter-shaft, the cutter-shaft being removable from said gear and through the bearing and outlet, a driving-shaft journaled in a bearing on the supporting-frame and provided with a gear, and an intermediate gear meshing with the gears on the driving and cutter shafts and located below the said detachable gear, whereby the intermediate gear is adapted to prevent downward displacement of the detachable gear when the cutter-shaft is removed therefrom, means being also provided for preventing lateral displacement of said gear after removal of the cutter-shaft.

2. A meat-chopper comprising a frame having a receiving-hopper and a lateral outlet, a cutter-shaft journaled in said frame and located in said outlet, said shaft and outlet having coöperating cutting members, one end of the cutter-shaft projecting through a bearing formed at one end of the casing, a gear detachably secured to the projecting end of the cutter-shaft, the cutter-shaft being removable from said gear and through the bearing and outlet, a driving-shaft journaled in a bearing on the supporting-frame and provided with a gear, an intermediate gear meshing with the gears on the driving and cutter shafts and located below the said detachable gear, whereby the intermediate gear is adapted to prevent downward displacement of the detachable gear when the cutter-shaft is removed therefrom, and a hood affixed to the supporting-frame and inclosing said gears, said hood coöperating with the intermediate gear in preventing lateral displacement of the detachable gear and having an opening which permits access to the device which secures the detachable gear to the cutter-shaft.

In testimony whereof we have affixed our signatures in presence of two witnesses.

LEANDER B. COBB.
CHARLES M. JENKINS.

Witnesses:
MARCUS B. MAY,
A. D. HARRISON.